UNITED STATES PATENT OFFICE.

CHARLES HALFORD THOMPSON, OF TEIGNMOUTH, ENGLAND.

FERTILIZING MATERIAL AND PROCESS OF MAKING SAME.

SPECIFICATION forming part of Letters Patent No. 550,545, dated November 26, 1895.

Application filed December 28, 1894. Serial No. 533,205. (No specimens.) Patented in England November 1, 1894, No. 20,971.

*To all whom it may concern:*

Be it known that I, CHARLES HALFORD THOMPSON, F. R. H. S., colonel in Her Majesty's Regiment of Royal Artillery, a subject of the Queen of Great Britain, residing at Teignmouth, England, have invented certain new and useful Improvements in the Manufacture of Fertilized and Fertilizing Materials for Promoting the Growth of Plants, (for which I have obtained a patent in Great Britain, No. 20,971, bearing date November 1, 1894,) of which the following is a specification.

My invention relates to the manufacture of improved fertilized materials.

The chief object of my said invention is to provide an improved fertilized fibrous or spongy material which will serve as a substitute for earth for supporting, nourishing, and sustaining the vitality of plants. For this purpose I manufacture a fibrous or spongy material impregnated with substances such as are hereinafter mentioned which are capable of affording nourishment to and of promoting or stimulating the growth of plants. The fibrous material which I prefer to use in such manufacture is peat-moss. I can, however, use other suitable fibrous or spongy absorbent material—such, for instance, as ordinary moss, cocoanut fiber, or clippings of sponges. I impregnate such fibrous or spongy material, as hereinafter described, with a fertilizing composition mainly consisting of soot, bone-meal, gypsum, phosphoric acid, and water, or their chemical or functional equivalents.

My said invention also comprises an improved process of manufacture of my fertilized material, which process consists in immersing the peat-moss or other fibrous or spongy material in water acidulated with dilute phosphoric acid, boiling it therein, together with the fertilizing composition, and then draining and partially fermenting the product. This treatment causes an interchange of chemical ingredients between the gypsum and other substances employed, whereby the product is rendered very fertile and at the same time entirely obviates the liability to any injurious action such as is exerted upon the roots of plants by some of the fertilizers heretofore used. I have ascertained, moreover, that the aforesaid fertilizing composition and also the residual liquor remaining after the manufacture of my improved fertilized material are very advantageous for use in a diluted form for watering plants or for fertilizing soil.

In manufacturing my improved fertilized and fertilizing materials I find it advantageous to proceed as follows—that is to say, I first put, say, fifty gallons of water into a suitable boiler or caldron, and into this pour about eight ounces of dilute phosphoric acid, more or less, according to the strength of the acid. I then place in a suitable vessel or holder the following ingredients, in or about the proportions stated—viz: ten pounds of soot, sixteen pounds of bone-meal, (ground very fine,) and sixteen pounds of raw gypsum. These materials are mixed in the said vessel or holder with a small quantity of water or of the liquor from the said boiler or caldron until the mixture is of the consistency of mortar. The solution of phosphoric acid and water in the boiler is, meanwhile, caused to boil, after which the said vessel or holder and its contents are lowered into the boiler. The space remaining in the boiler above the bottom of the said vessel or holder is then filled up with peat-moss, preferably of the variety imported from Holland in turves, the said moss being previously broken up into fragments of convenient size. The peat-moss is then allowed to boil in the solution contained in the boiler for from twenty to thirty minutes, the time necessary varying according to the absorbent character of the fibrous material employed, and is well stirred up during that period, after which it is taken out and put into a cask or other suitable vessel having a perforated bottom. In this cask it is well pressed down and the liquor is allowed to run out through the holes in the bottom of the cask into a catch-pan below; or other suitable means may be employed for draining off or separating the liquor from the said peat-moss. The liquor thus drained off is replaced in the boiler, and the latter is refilled with fresh water, adding about two ounces of phosphoric acid, and a fresh charge of peat-moss is put in. These operations are repeated a third time or a greater number of times, if desired, when the whole of the peat-moss which has been subjected to the treatment above described is put into a heap in a pit and allowed to ferment by itself, the temperature being taken periodically with a "bottom-heat" or other suitable thermometer. When the temperature reaches or exceeds 120° Fahrenheit, or thereabout, the fertilized peat-moss is taken out, spread abroad, and allowed to remain for about two hours and is then replaced in the heap. This operation is repeated until the thermometer no longer registers more than 120°.

The liquor remaining after the above process is completed may be collected and sold for use in watering plants and for similar purposes when diluted.

I can also, if desired, manufacture a liquid fertilizer separately in the manner above described, using the ingredients above mentioned in, or about in, the proportions stated, fermenting the same with yeast and checking the fermentation of the liquid at a certain point by adding sulphur to it.

The boiler employed may be of any suitable construction which will permit of the materials being boiled without overheating in any parts and of the treated fiber being readily and conveniently removed after such treatment.

In some cases I find it advantageous to provide a cage or a trellis-work or perforated extension to the wall of the aforesaid vessel or holder, so that the treated fiber may be the more readily removed in bulk. It is, moreover, obvious that I can, if desired, somewhat modify my process of manufacture provided the peat-moss or other material is immersed in a mixture or fluid containing the several ingredients at the required temperature for a period of from twenty to thirty minutes. For example, I may pass peat-moss continuously through a long tank which is continuously supplied with the fertilizing mixture and maintained at the proper temperature by steam coils, jackets, or in any other convenient manner.

In manufacturing my improved fertilized and fertilizing materials I can substitute ordinary moss, cocoanut fiber, or clippings of sponge for the peat-moss hereinbefore mentioned, and other chemically or functionally similar materials may be substituted for these or the other ingredients mentioned, and the relative proportions of the several ingredients may be somewhat varied without departing from the nature of said invention. For example, in lieu of the bone-meal I can use the following mixture—viz: gelatin, thirty-three per cent.; phosphate of lime, fifty-seven per cent.; carbonate of lime, four per cent.; phosphate of magnesia, three per cent.; chlorid of sodium, three per cent.

Instead of the gypsum I can use the following mixture—viz: calcium sulfate, sixty-five per cent.; calcium carbonate, ten per cent.; oxid of iron, three per cent.; alumina, two per cent.; silicate of lime, fifteen per cent.; water, five per cent.: and in lieu of the soot I can employ the following mixture—viz: carbon, fifty per cent.; potash, five per cent.; chlorid of ammonium, one per cent.; sulfate of ammonium, six per cent.; chlorid of sodium, twenty-five per cent.; oxid of iron, ten per cent.; oxid of aluminum, five per cent; sulfate of lime, ten per cent.; phosphate of lime, one per cent.; carbonate of lime, one per cent.; silicate of lime, 2.25 per cent; silicate of magnesia, .5 per cent; silica, eight per cent.

I have found that by virtue of the invigorating properties of my fertilized material plants transplanted into the same do not "flag," as is usually the case with plants which are transplanted into earth, it being only necessary to shade the said plants a little, gradually exposing them to the sun and air until they will stand full effects without flagging. Moreover, plants grown in this material and transplanted into soil do not flag, as they have a ball of the material round their roots to feed upon.

My improved fertilized material, moreover, possesses the advantages over earth in that it is much lighter and does not necessitate the use of the heavy earthernware pots usually employed; it is very valuable for sustaining the life of plants used for decorative purposes or placed in window-boxes or the like; it is more cleanly than earth and saves much time and trouble in repotting; it requires watering much less frequently than earth and does not give off any disagreeable smell; it suits all kinds of plants, thus obviating the necessity for adapting the soil to the plant; it saves much time in "bedding out" plants, as plants grown in my improved fertilizing material instead of earth do not flag when bedded out; it enables plants to grow in smaller pots than are required when earth is used, and, further, it brings out the color of the flowers and the flowers have less tendency to fall off than when grown in soil.

What I claim as my invention is—

1. The process of manufacturing a fertilized material, which process consists in boiling peat moss or other suitable fibrous or spongy material in a weak solution of phosphoric acid together with a fertilizing composition, and then straining and partially fermenting the product.

2. The process of manufacturing a fertilized material, which process consists in boiling peat moss or other suitable material in a weak solution of phosphoric acid together with a composition of soot, bone-meal and gypsum, and then straining and partially fermenting the product.

3. As an article of manufacture, a fertilized material, consisting of suitable fibrous or spongy substance such as peat moss, the fibers of which are impregnated or saturated with a fertilizing composition containing a liquid and gypsum as ingredients, and which is partially fermented, substantially as described.

4. As a new article of manufacture, a fertilized material consisting of peat-moss or other suitable fibrous or spongy substance the fibers of which are impregnated or saturated with a fertilizing composition consisting of dilute phosphoric acid, soot, bone-meal and gypsum, and which is partially fermented, substantially as hereinbefore described.

5. As a new article of manufacture, a liquid consisting of a weak solution of phosphoric acid in which has been boiled a fertilizing composition consisting of soot, bone-meal and gypsum and which has afterward been fermented with yeast, substantially as hereinbefore described.

CHARLES HALFORD THOMPSON.

Witnesses:
DAVID YOUNG,
H. W. LYNDEN.